(12) United States Patent  (10) Patent No.: US 6,212,390 B1
Rune  (45) Date of Patent: Apr. 3, 2001

(54) RESTRICTED MOBILITY AREA

(75) Inventor: Johan Rune, Lidingö (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/023,160

(22) Filed: Feb. 13, 1998

(30) Foreign Application Priority Data

Feb. 20, 1997 (SE) .................................................. 9700596

(51) Int. Cl.[7] ....................................................... H04Q 7/20
(52) U.S. Cl. ........................... 455/456; 455/410; 455/461
(58) Field of Search ................................. 455/446, 422, 455/435, 436, 456, 410, 411, 414, 419, 461; 380/247, 270

(56) References Cited

U.S. PATENT DOCUMENTS

| | | | | |
|---|---|---|---|---|
| 5,802,468 | * | 9/1998 | Gallant et al. | 455/422 |
| 5,907,802 | * | 5/1999 | Scott | 455/406 |
| 6,029,066 | * | 2/2000 | Despres et al. | 455/419 |
| 6,038,439 | * | 3/2000 | Rune | 455/406 |

FOREIGN PATENT DOCUMENTS

| | | |
|---|---|---|
| 0 568 824 A2 | 11/1993 | (EP) . |
| WO 96/34504 | * 4/1996 | (SE) . |
| WO 96/39000 | * 5/1996 | (SE) . |
| WO 96/34500 | 10/1996 | (WO) . |
| WO 96/34505 | 10/1996 | (WO) . |
| WO 96/39000 | 12/1996 | (WO) . |

* cited by examiner

Primary Examiner—William G. Trost
(74) Attorney, Agent, or Firm—Burns, Doane, Swecker & Mathis, L.L.P.

(57) ABSTRACT

The present invention relates generally to dividing a cellular mobile communications system into general geographic areas. The cellular system is logically divided into an access provider, having knowledge of and controlling access to the system over the air interface, and a core service provider having subscribers and providing services to those subscribers over the bearer services provided by the access provider. The core service provider chooses some general area within which a particular service is to be provided or within which access is to be restricted. This information is transmitted to the access provider who then maps this information onto the cellular system, thereby determining which cells within the network lie within the area designated by the core service provider.

21 Claims, 6 Drawing Sheets

RESTRICTED MOBILITY AREA

FIELD OF THE INVENTION

The present invention relates generally to the use of restricted mobility areas in mobile communications systems, and more particularly to a method of allowing subscriber access to the system based on a real-time definition of restricted geographical areas, rather than allowing subscriber access to the system based on an area defined in terms of restricted lists of cells.

RELATED ART

Normally a user in a mobile cellular network can move around and access the network in the entire service area of the network. In some cases, however, restricting the area in which the user is allowed to move around and access the network can be regarded as a feature.

For example, charges could be differentiated on the basis of the allowed range of mobility. A user could have different tariffs for different geographic areas e.g. a part of a city, the entire city, or the entire country. Restricted mobility could also be used to introduce services in specific areas, i.e. specific services might only be allowed for particular geographic areas.

The problems with state of the art solutions are that restricted mobility in a cellular system has to be predefined (i.e. not real-time), and the geographical area is defined merely by using a list of cells available for access. Thus, there exists a problem with defining a general restricted geographic area without knowledge of the cellular structure of the network, and defining this area in real-time.

Although this problem exists with any cellular network, it is particularly acute in a Generic Radio Access Network ("GRAN"). A GRAN can be described as a radio access network with a generic interface to which any type of core network (e.g. GSM, ISDN, PSTN, Internet, etc.) can connect. See FIG. 1. The basics of a GRAN have been described, in PCT/SE96/00510, "METHOD AND ARRANGEMENT FOR INCREASING THE RANGE FOR A TELECOMMUNICATION NETWORK IN A TELECOMMUNICATION SYSTEM." It is part of the ongoing development of a Universal Mobile Telecommunications System ("UMTS") within the European Telecommunications Standards Institute ("ETSI").

UMTS has been described as a 'third-generation' mobile communications system, as compared with current mobile systems like GSM which are referred to as 'second-generation.' UMTS is a broadband multimedia system that will support all that current wired and wireless technology can offer and have the ability to support new applications that are common to both, or unique to UMTS. Thus, UMTS is seen as a way of facilitating the convergence of wired and wireless networks as seamlessly as possible.

In terms of today's technology, UMTS can be thought of as having many different faces: PLMN, PSTN, wireless PABX, wireless LAN, RLL, private mobile radio, satellite systems, paging networks, mobile data networks, etc. Since the UMTS aids access between these networks, parts of the UMTS 'network' will be installed and operated by competing telecommunications operators. Other parts will be under private ownership. It is therefore foreseen that roaming between different zones under different ownership, probably resulting in a changing tariff scheme, will be supported in the UMTS environment.

Figure 1:
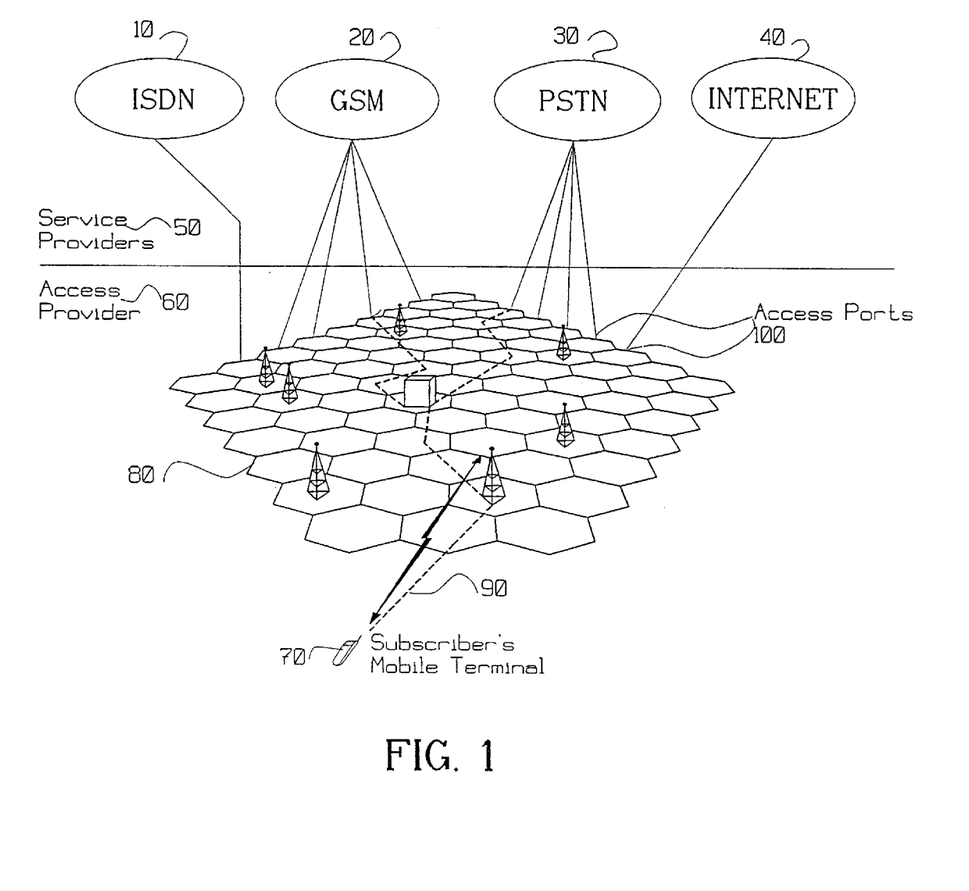
FIG. 1 is a drawing of a cellular mobile communications system where several service providers provide services over a cellular network operated by an access provider.

UMTS will be operating in a highly competitive environment, so it must allow an individual service provider 50 FIG. 1 (e.g. ISDN 10, GSM 20, PSTN 30, INTERNET 40 FIG. 1) to provide services with features that are distinct from similar services from other providers, without causing limitations for roaming in other networks. For UMTS users roaming outside their home network, any visited network should be transparent to the call procedures the roaming customer is used to. The user should not notice that he, or she, has moved to another UMTS network that may offer its own clients a different set of arrangements.

One result of UMTS is that the access network 80 responsible for communication with terminals 70 over the air interface 90 will probably be independently owned and operated from those who own and operate as service providers 50. For example, a GSM user may access the GSM network 20 through an independent access network 80 in the UMTS. Similarly, a customer of the PSTN at home may also access the PSTN 30 through the same, or perhaps a different, access network.

There will thus be a need in the UMTS of a radio access network with a generic interface to which any type of core network can connect. That is the concept of the GRAN, as described in PCT/SE96/00510 and shown in FIG. 1. The mobile cellular network 80 will probably be owned and operated by an access provider 60, the GRAN operator, by providing access to the service providers 50 over the air interface 90. The GRAN operator 60 will have no subscribers of its own, but will be merely providing access to the core network service providers 50 for their subscribers.

Figure 2:
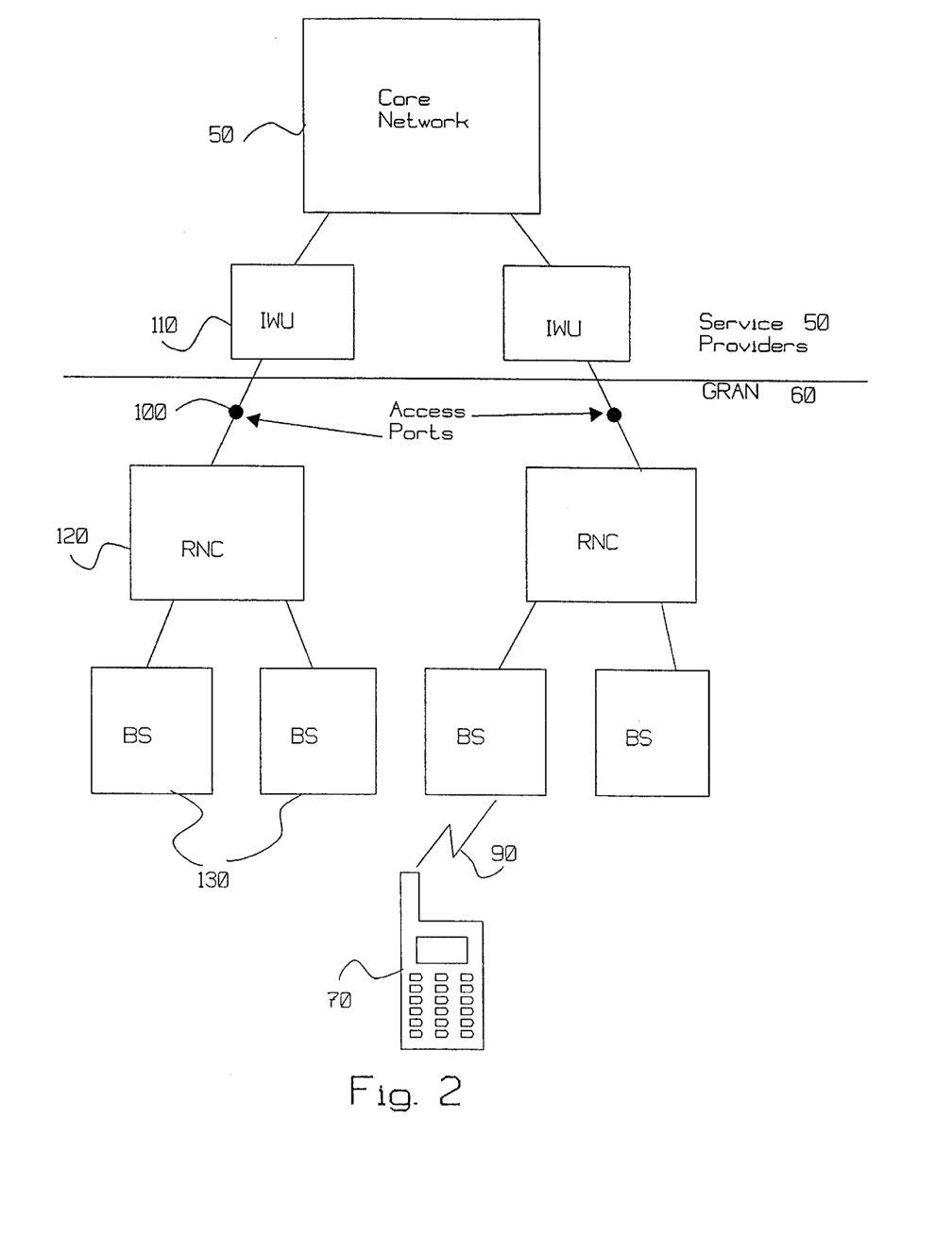
FIG. 2 is a diagram of the system of shown in FIG. 1.

Each of the core networks 50 will be able to access the cellular network 60, the GRAN, through one or more 'access ports' 100 as shown in FIG. 1 and FIG. 2. These access ports 100 will then be connected to Radio Network Controllers ("RNC") 120 which control the various base stations 130 in the cellular network 80. The individual subscribers to the various service providers 50 will be provided access to their service provider through appropriate base stations 130.

A diagrammatic view of this system can be seen in FIG. 2. The Future core networks may be tailored to fit the generic interface, but existing core networks will have to use an interworking unit ("IWU") 110 between itself and the GRAN 60. The terminals 70 used while accessing the GRAN 60 will consist of one part that logically belongs to the GRAN 60 and a second part that logically belongs to the core network.

Core network subscribers can access their respective core network 50 through the GRAN 60, which is done using bearer services that the GRAN 60 offers the core networks 50. Thus, two major purposes of the GRAN 60 are to extend the ranges of existing core networks and to provide wireless access and mobility to their subscribers.

As mentioned above, the GRAN 60 has no subscribers. Only the core network service providers 50 have subscribers. The users of the GRAN 60 exist only while they communicate. The GRAN 60 is also independent of the service control signalling used by the service providing operators 50. It does, however, provide basic terminal control, including: idle mode control, basic access with control establishment to the service providing network associated with the terminal and service, and resource control with handover control and performance.

The GRAN 60 also provides interworking functions for interworking with and between the service providers' networks. This interworking is part of the access network, but may be implemented as part of the service providers' networks as shown in FIG. 2. This functionality will allow roaming between networks and within a given network, depending on the service provided by the user's service providers.

For example, a user might use his terminal to access the PSTN while at home, a GSM network while driving to work, and an ISDN while at work. Usage like this should be allowed whereby the different service providers could limit their services based on geographic location. These various service provLders would like to be able to restrict the user's access to a geographic location, based generally on physical location, using e.g. longitude and latitude.

This restriction in the past was done by one operator who served as both the access provider and the service provider. It was done by making a list of cells that the user would be restricted to. This required a knowledge of the cell structure of the mobile system. In the future, the service providers in the UMTS will have no knowledge of the cell structure of the mobile system and yet would like to be able to restrict their users' access based on some generally described physical area. Thus, a problem exists allowing service providers to define restricted mobility areas and communicate that information to the access providers who will then restrict the user's access to the system over the air interface based on the restricted mobility definitions supplied by the service providers.

A similar problem with current systems occurs when a particular user needs to broadcast information to other users in the system. This might be a system such as the Cellular Digital Packet Data ("CDPD"), which is the packet data service in D-AMPS networks. Under current systems, if a user wishes to limit a broadcast to a particular area, it is predefined(i.e. not real-time) as a list of cells. The broadcast is then sent as unencrypted information to be received by all users in the system. Thus, there is a problem in being able to limit access to the broadcast information to a limited area and group of users.

One example of an approach used to define generally limited areas is shown in PCT/SE96/00615. This patent uses the longitude and latitude of a subscriber's home address to determine coordinates for a home location area and the services available within that area. However, the approach in this patent still leaves certain problems to be solved. It does not allow a certain area to be defined in real-time on a per-connection basis. Also, it does not allow the definition of an area relative to the subscriber's terminal at the time of attempted access, rather than only in advance of that time. Finally, this previous patent also does not provide for hierarchical cell structures or the possibility of transferring this information to the terminal.

SUMMARY OF THE INVENTION

As has been seen, in the UMTS of the future a GRAN may be used to provide access over the air interface between many users and many service providers. This will be a many-to-many relationship. There will be numerous users on the air interface side of the GRAN and numerous service providers on the land-link side. Because of this separation of the network into separate service providers and access providers, the service providers will probably have no knowledge of the cell structure of the network. However, they will still want to be able to limit particular services or particular users to particular geographic areas. Therefore there exists a problem of taking a general area definition and communicating it to the GRAN which can then determine in real-time the cells through which the user may access the system.

Accordingly, an object of the present invention is to provide a method of using a geographical area based on geographical coordinates and shape parameters provided by a service provider and deciding which cells may be accessed through an access provider in that geographical area.

More particularly, it is an object of the present invention to allow a service provider to define restricted areas in real-time based on geographical coordinates and shape parameters and to allow the access provider to thereby restrict a user's access to the system, or to certain services, through certain cells based on the defined restricted areas.

Briefly described, the present invention achieves these objects by first defining geographical coordinates for each cell. These coordinates should be chosen to, as well as possible, represent the geographical location of the cell and will usually be the longitude and latitude of the center for that cell or sector.

The restricted area is then defined as a geographical area using geographical coordinates and shape parameters. The shapes described by these shape parameters could be regular shaped geometric objects, e.g. rectangles, circles, general polygons, etc., or perhaps irregularly shaped objects defined using focal points and a generalised radius.

The cells, whose geographic coordinates are inside the defined geographical area, are considered to be part of the restricted area, and the terminal will be allowed to access the system and/or services available within each of these cells.

Since the definition of the restricted area is not tied to the infrastructure of the network, a restricted area may be defined without knowledge of the cell structure. Therefore, a restricted area can be predefined for a particular user, or, in the case of the GRAN, for all the subscribers of a certain core network. It could also be defined in real-time on a per connection basis, all without involving the operator of the network. In this last case the restricted area is specified when the connection is requested.

The present invention also finds application in defining broadcast areas for data. In certain systems, users sometimes wish to broadcast certain data to other users within the system. They might wish to broadcast that data to only those users within a particular geographic area, perhaps only those users within a certain distance of their current location. It is possible in the present invention to send the area definition to the GRAN along with the data to be broadcast. The GRAN will then broadcast the data only to those cells within the defined area. The difference here is that a subscriber defines the area, and that area is not necessarily related to the location of any particular terminals.

The present invention achieves its objectives and provides advantages over prior approaches, such as allowing a restricted area to be defined in real-time and/or relative to the subscriber's terminal at the time of attempted access. In addition, the present invention provides for a permanence in the area definitions not available in prior approaches. Because prior approaches had area definitions based on the cell structure, these definitions had to be changed whenever the cell plan changed, either due to increasing cell density or to expansion of the coverage area. The present invention allows the area definition to remain constant through all changes in the cell structure of the system.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

In FIG. 2 is shown a core network 50 connected to a GRAN 60 through access ports 100. A given core network 50 may be connected to the GRAN 60 through one or many access ports 100. At each access port 100 there is an Inter Working Unit ("IWU") 110 between the core network 50 and the GRAN 60. On the GRAN 60 side there is a Radio Network Controller ("RNC") 120 and at least one Base Station 130.

If a core network 50 doesn't support terminal mobility, or if a particular user isn't provided with mobility, then that user always accesses the core network 50 through the same access port 100. A user with mobility can access the core network 50 through any of the access ports 100 to which the core network 50 is connected. Normally the one that provides the shortest route will be used. The GRAN's 60 internal mobility management will be used to support local mobility, while the mobility management of the core network 50 will be used to realise a change of access port 100 in the core network 50.

A user will subscribe to various services in one, or perhaps several, of the core networks (e.g. ISDN 10, GSM 20, FIG. 1). The core networks 50 use the generic bearer services, provided by the GRAN 60 operator, to connect their subscribers, thereby extending the range of their networks and providing mobility to their subscribers.

In the GRAN 60, geographical coordinates are defined for each cell and may be used, for example, as the basis of a location area scheme. In the preferred embodiment of the present invention the geographical coordinates for a given cell will be defined to be the center of that cell.

The geographical coordinates used in the preferred embodiment of this invention will be those of longitude and latitude. It can be appreciated by those in the art that longitude and latitude are not the only means of indicating geographical location, and the present invention can function as well using other means of indicating geographical location.

As indicated above, the preferred method for defining a geographical location of a cell will be to use the coordinates of its center. The present invention is not limited to use of the center in defining the geographical location of a cell. In sectored cells, for example, it might be useful to use the location of the center of each cell sector. The operator of the GRAN 60, being most familiar with the cell structure, has considerable freedom in determining the coordinates to be used for the location of a cell, depending on the function of the system and the needs of the various service providers.

In various situations, examples of which will be given below, a service provider 50 will wish to define a "restricted mobility area." This restricted mobility area will be defined as a geographical area using geographical coordinates and shape parameters. As for the location of a cell, the geographical coordinates of a restricted mobility area will be longitude and latitude in the preferred embodiment, although the present invention does not limit defining restricted mobility areas to using longitude and latitude.

Shape parameters will also be used to determine the restricted mobility areas. These shapes could be e.g. rectangles, circles, triangles, ellipses, or combinations thereof. Also, the concept of focal points and a generalised radius, as discussed below, can be used to define irregular shapes.

For example, a restricted mobility area might be defined in terms of a circle. The geographical coordinates of the circle's center could be defined, along with the radius of the circle. The restricted mobility area could then be given using just two pieces of information, the center along with the radius of the circle.

For a square the restricted mobility area would also be defined in terms of the center of the square. A square can be uniquely defined, for example, by merely providing the location of the center and two corners of the square. As compared with the circle, this restricted mobility area defined by the service operator 50 could be communicated to the GRAN 60 with just three pieces of information, the center and two corners.

Figure 4:
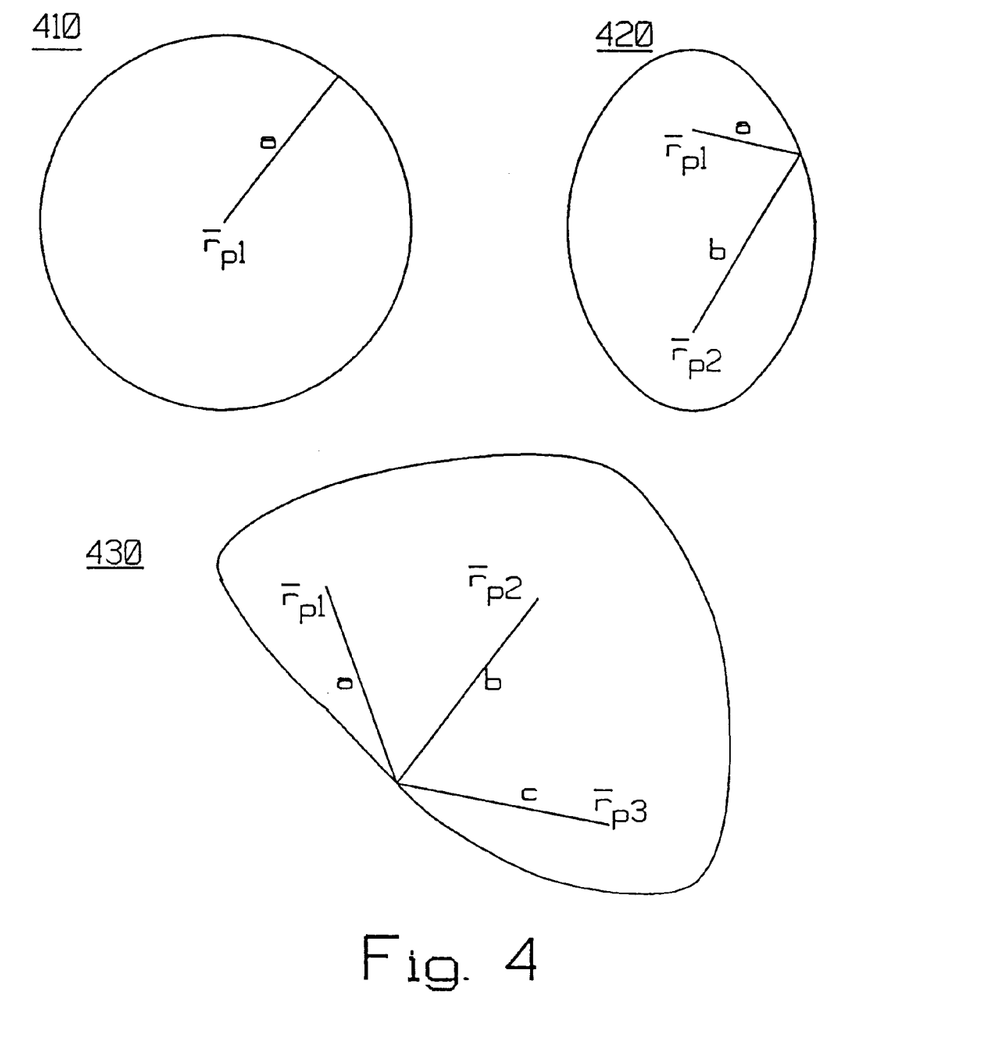
FIG. 4 illustrates the use of focal points and a generalised radius to define a general area.

There exist numerous examples of regular geometric shapes that could be easily used to define a restricted mobility area. There might also exist a desire to define the restricted mobility area in terms of an irregularly defined shape. One method of doing this is to use the concept of focal points and a generalised radius as shown in FIG. 4. A generalised radius defines the relation between the border line of an area and one or multiple focal points, $\bar{r}_p$ (numbered from 0 to $n_{FP}-1$).

The generalised radius $R_G$ is defined as the sum of the distances from a point at the border line to each of the focal points, i.e. the border line of an area with the generalised radius $R_G$ is defined as the points $\bar{r}$ (border line) which fulfils the relation $$\sum_{i=0}^{nFP-1}$$

$|\bar{r} \text{ (border line)} - \bar{r}_{Pi}| = R_G$ where $n_{FP}$ is the number of focal points.

If $n_{FP}=1$, the area is a circle, 410 FIG. 4. If $n_{FP}=2$, the area is an ellipse, 420 FIG. 4. If $n_{FP} \geq 3$, the area has some other shape, possibly asymmetric, e.g. 430 FIG. 4. An area with a given generalised radius, $R_G$, has its maximum area when all the focal points coincide, i.e. when the area is a circle with the radius equal to $R_G/n_{FP}$. As soon as a focal point is shifted from the others the area is reduced, provided that the $R_G$ stays the same. As follows from the definition above, a point lying inside the area, $\bar{r}$ (area), must satisfy the relation $$\sum_{i=0}^{nFP-1}$$

$|\bar{r} \text{ (area)} - \bar{r}_{Pi}| \leq R_G$, where $n_{FP}$ is the number of fecal points.

It will be appreciated by those in the art that there exist other mathematical techniques to describe irregularly shaped areas. These methods could all be used by the core networks to define restricted mobility areas for the network or for particular users and/or services. The information defining a restricted mobility area must be transmitted from the core network service provider 50 to the GRAN 60 operator, so the less information needed to define a restricted geographic area, the better.

Figure 3:
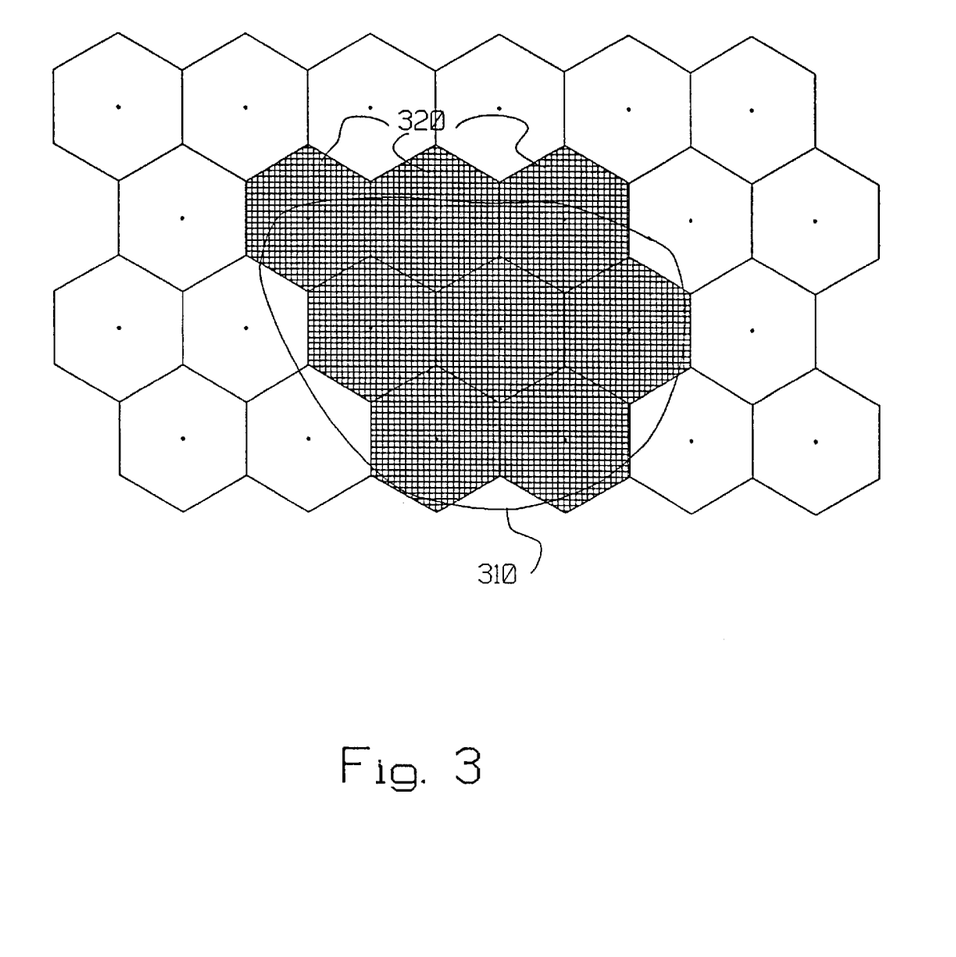
FIG. 3 is a drawing showing which cells are determined to be inside a general area.

After a core network 50 has decided on a restricted mobility area for a user, or group of users, that information will be transmitted to the operator of the GRAN 60. As discussed above, the information will include the geographic coordinates, preferably in terms of longitude and latitude, and the shape parameters, e.g. the radius of a circle. The operator of the GRAN 60 can then determine which cells come within the restricted mobility area as shown in FIG. 3.

There are many ways to calculate whether a cell, or cells, lie within the restricted mobility area. Since the GRAN 60 operator has the coordinates of each cell stored, it is quite easy to calculate whether or not a cell lies within the boundary for the restricted mobility area. For example, assume the core network 50 has transmitted a restricted mobility area consisting of a center and radius. The GRAN 60 operator will take the geographic coordinates for each cell.

It will then calculate the distance from the center of the restricted mobility area to the cell coordinates, which in the preferred embodiment will be the longitude and latitude of the cell center. If that distance is less than the radius of the circle, then that cell will be determined to lie within the restricted mobility area. If the distance is greater than the radius, then the cell will be outside the restricted mobility area. Thus, for example, the subscriber attempting to access the system through any of the cells e.g. 320 FIG. 3 whose centers lie within the restricted mobility area 310 will be allowed access.

A similar method can be used when defining irregular restricted mobility areas using the concept of focal points and a generalised radius. The core network operator 50 will transmit the geographic coordinates of the focal points used to define the area in addition to the value for the generalised radius $R_G$. Again the GRAN 60 operator can perform calculations for each cell, using the geographic coordinates for that cell. As discussed above, the cell coordinates will be deemed inside the restricted mobility area if the cell coordinates satisfy the relationship $$\sum_{i=0}^{nFP-1}$$

$|\bar{r} \text{ (cell center)} - \bar{r}_{Pi}| \leq R_G$, where $n_{FP}$ is the number of focal points.

Figure 5:
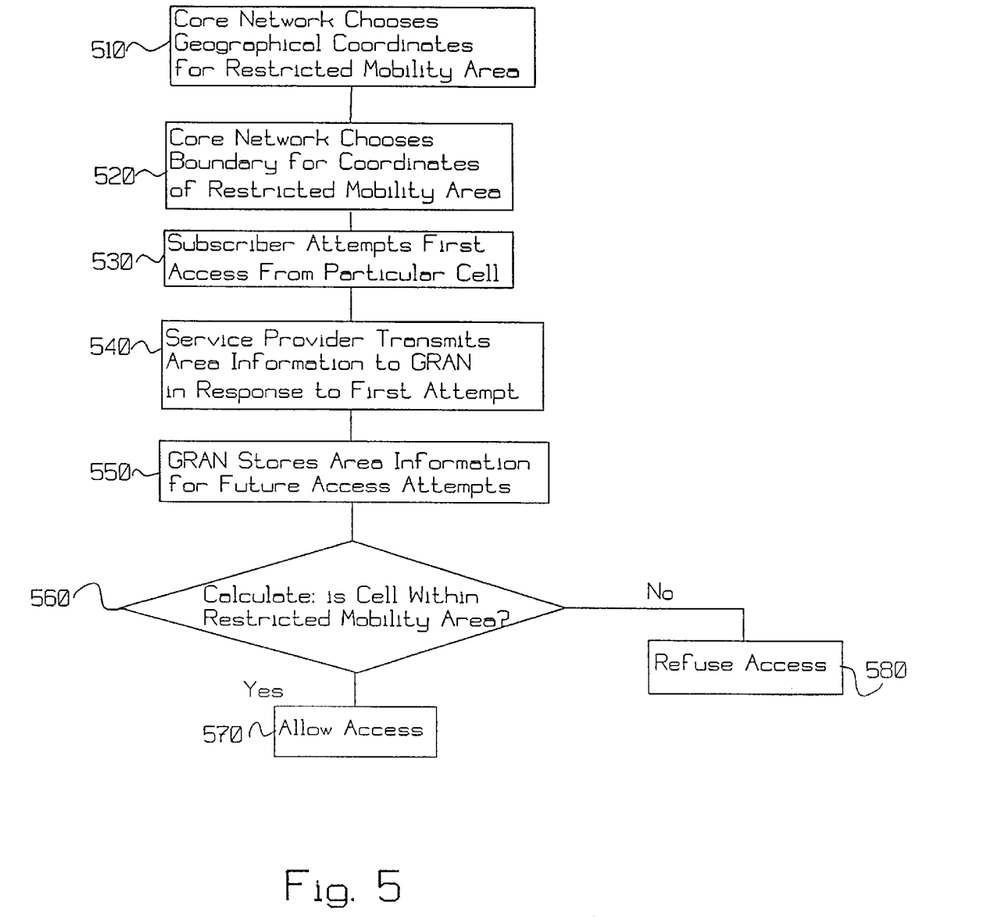
FIG. 5 is a flowchart illustrating the steps of the method in the preferred embodiment of the present invention.

The steps of the preferred embodiment of the present invention are summarised in FIG. 5. In the first step of the method of the present invention the core network (e.g. GSM 20 FIG. 1) chooses the geographical coordinates 510 for the particular restricted mobility area. These could be e.g. the center of a circle. The core network will then choose a boundary 520 for the area surrounding the geographical coordinates. This is done by e.g. choosing a radius for the circle of a particular length. The core network will store this information until the subscriber attempts his or her first access 530 to the services of the core network through a particular cell in the GRAN.

In response to this first access attempt the core network will transmit 540 the area information to the GRAN operator. The GRAN will then store this area information 550 for future access attempts by the same subscriber. As long as the subscriber's terminal remains registered with this particular GRAN (e.g. while the terminal remains turned on) the GRAN will store the information in case the terminal wishes to use the system again.

Next, the GRAN will calculate 560 whether the cell through which the subscriber is attempting access lies within the restricted mobility area or not. If it is inside, then the subscriber will be allowed to access the core service provider 570. If it is outside, then the subscriber will be refused access 580.

This first attempt to access the core network will register the subscriber's terminal with the GRAN, although there are other ways to register, e.g. by turning on the terminal. This will be true whether the first attempt results in access or not. As long as the subscriber's terminal remains registered with the system the GRAN will have the area information stored. In future access attempts, the method of the present invention will only need to calculate whether the access cell is within the restricted mobility area or not, because the GRAN does not need to receive the area information from the core network. However, it would be possible, if desired, to require the GRAN to query the core network after every access attempt in case the area definitions were updated frequently, or not stored in the GRAN.

One example of a use will be a restricted mobility area. In certain instances it might be desirable for the core network operator to limit access for a particular user to a particular geographic area. The core network operator might, for example, wish to restrict the subscriber to use the network within a certain distance of the subscriber's house or office. As part of the subscription process, the core network operator would receive the geographic coordinates of the subscriber's house or office. The core operator would then define a geographic area surrounding that house or office within which the subscriber would be allowed to access the mobile system.

Whenever the subscriber tries to access the mobile system through the GRAN, the GRAN will first take notice through which cell the subscriber is attempting access. The GRAN will use the geographic coordinates for that cell as the geographic coordinates for the user at the time of access. The GRAN will forward the subscriber information to the core network to indicate that this particular subscriber is attempting to access the system. The information regarding the coordinates and shape of the restricted mobility area for this particular subscriber would then be sent to the GRAN operator. The GRAN operator will then determine whether the coordinates for that particular cell lie within the restricted mobility area. If it does, then the GRAN will allow the subscriber to access the system. If it does not, then the GRAN will refuse to allow the subscriber to access the system.

Note that in this particular embodiment that the subscriber access attempt is sent to the core network which then sends the information regarding the restricted mobility area to the GRAN. The GRAN then determines whether the subscriber is access within the restricted area or not. It can be appreciated by those skilled in the art that other embodiments are possible.

For instance the information for all the subscribers of the core network can be temporarily stored in the GRAN. This information could be sent from the core network to the GRAN when the subscriber's terminal registers with the GRAN. The GRAN would then have that information available for that particular subscriber as long as the subscriber's terminal was registered for that particular GRAN. In this way, the GRAN could then immediately determine whether the subscriber was within the restricted area without having to wait for the information from the core network.

Another possibility is that the core network could perform the calculations itself. The GRAN could route the access attempt along with the cell coordinates to the core network where the subscriber information is stored. The core network would then retrieve the information on the restricted mobility area and calculate whether the subscriber was within that area. If it was within the area then it would send a signal to the GRAN operator telling the GRAN operator to allow the subscriber to access the system.

From the discussion in the previous paragraphs it can be seen that the information regarding the subscriber's restrictions can be stored either with the core network operator or temporarily in the GRAN. In the preferred embodiment it will be stored with the core network operator because the subscriber is a subscriber of the core network's services, not the GRAN's. Also, the calculations to determine whether the subscriber is within an area or not can be done at the GRAN operator or at the core network operator. However, in the preferred embodiment they will be done at the GRAN operator.

This is because the GRAN operator will usually be providing access for several core network operators. The GRAN will be more specialised to determine whether to allow access or not. But it can be pointed out that the same operator may operate both the GRAN and the core network as is done in most conventional systems today. The distinction between the GRAN access network and the core service network is a logical one and the functions and services can be divided however the operators may decide.

Another example of a restricted mobility area could be to define restricted areas for a whole core network. For example, there might be three core service networks that all use the same GRAN as an access network. It might be desirable to divide these operators into three distinct, but possibly overlapping, geographic operating regions. The GRAN could then determine when a subscriber was attempting access which core network that subscriber belonged to. The GRAN would then calculate whether that subscriber was attempting access from the area covered by that particular core network. If it isn't when access will be denied.

It shall be pointed out that the restricted mobility area may be defined in relation to an absolute location or in relation to a dynamic reference point. A restricted mobility area may be defined in reference to a fixed point such as the subscriber's home. It may also be defined in terms of a dynamic point such as the point of access. This might be used, for example, to restrict the number of multiple handoffs for the terminal during active communication. This would work by first taking the coordinates of the cell through which the subscriber is attempting access.

A restricted mobility area could then be defined, for example, by restricting the subscriber to access within ten kilometers of his access point. This would then limit the subscriber's movements to ten kilometers of movement during the call. As the subscriber moves, the GRAN will check to see if the cell being handed off to lies within the restricted area or not. If it does not, then a message may be sent to the user indicating that the subscriber is about to leave the restricted area. If the user leaves the area then the connection may be severed.

The present invention may also be used in a system using a hierarchical cell structure. Cells on all hierarchical levels can have geographical coordinates and the coordinates can be broadcast. However, because higher level cells are used on a different spatial scale than the lower cells, a mixture of cells from different hierarchical levels in the same restricted mobility area may decrease the resolution of the specification of the area border in an undesirable way. Therefore, the intended hierarchical cell level, or levels, may be included in the specification of the restricted mobility area. In such a case, only the cells on the indicated hierarchical level, or levels, whose coordinates are inside the defined geographical area, are considered to be part of the restricted mobility area. A level identifier may also be broadcast in the cells.

As indicated, in the preferred embodiment the definition of the restricted mobility area is stored in the core network. This information is not normally sent to the subscriber's mobile terminal. However, if the terminal tries to access the network outside its allowed area, the definition of the restricted mobility area will be transferred to the terminal so that the terminal can avoid future access attempts in forbidden cells.

The rationale for this is that most terminals will probably never try to access a base station outside its allowed area, and it would be a waste of radio resources to transfer the definition of the restricted mobility area to those terminals. However, if a terminal attempts to access a base station outside the allowed area, it is already outside its restricted mobility area and is likely to try to access the same or other forbidden base stations again. In this case it is probably beneficial to transfer the definition of the restricted mobility area to the terminal as a response to an unsuccessful first attempt.

In this way the terminal can indicate to the user that he is outside his allowed area. In the GRAN, where the cell coordinates are broadcast in each cell, the geographical coordinates and the shape parameters can be transferred to the terminal, which can then by itself determine whether a cell is inside or outside the allowed area. In some networks, it might also be possible to merely transfer a list of cells, which is the result of the area definition, to the terminal.

Yet another example of the present invention is to use the area to define a service area, rather than a mobility area. The core network might wish to divide its service area into a high tariff, a medium tariff and low tariff regions. In this situation the core network will perhaps define the tariff regions for the whole system, or define individual tariff regions for each subscriber. An individual subscriber could have a different rate for accessing from home, from work, and for the area between home and work.

The core network will have to define three areas. The calculation will then have to determine whether the subscriber is attempting access within a particular area. Because the method of the invention determines whether the subscriber is either within or outside of a particular area, it might be necessary to perform three calculations. For example the system might first calculate whether the user is within the high tariff area. If he is then the calculations can end. If he isn't then the system must determine whether he is within the medium tariff area. If he is then the calculations can end.

If he isn't then the system must determine whether he is within the low tariff area or not, although the system might use the low tariff as a default if the calculations show he isn't within the high or medium tariff areas. So it car, be seen that normally dividing an area into n mutually exclusive service areas will require n calculations to determine whether or not the subscriber is within that area or not.

Another type of service used by core network operators is a broadcast service, for example the broadcast service used in Cellular Digital Packet Data ("CDPD"). In CDPD, for example, a network subscriber can use a broadcast service to broadcast data in a certain area to other subscribers' terminals that are present within that area. The transmitted data is unencrypted and can be received by all CDPD users within the broadcast area. The customer using the broadcast service will define the broadcast area when requesting a broadcast connection, and the GRAN operator will identify the cells that are considered to be inside the broadcast area and establish a point-to-multipoint connection to the relevant base stations.

Figure 6:
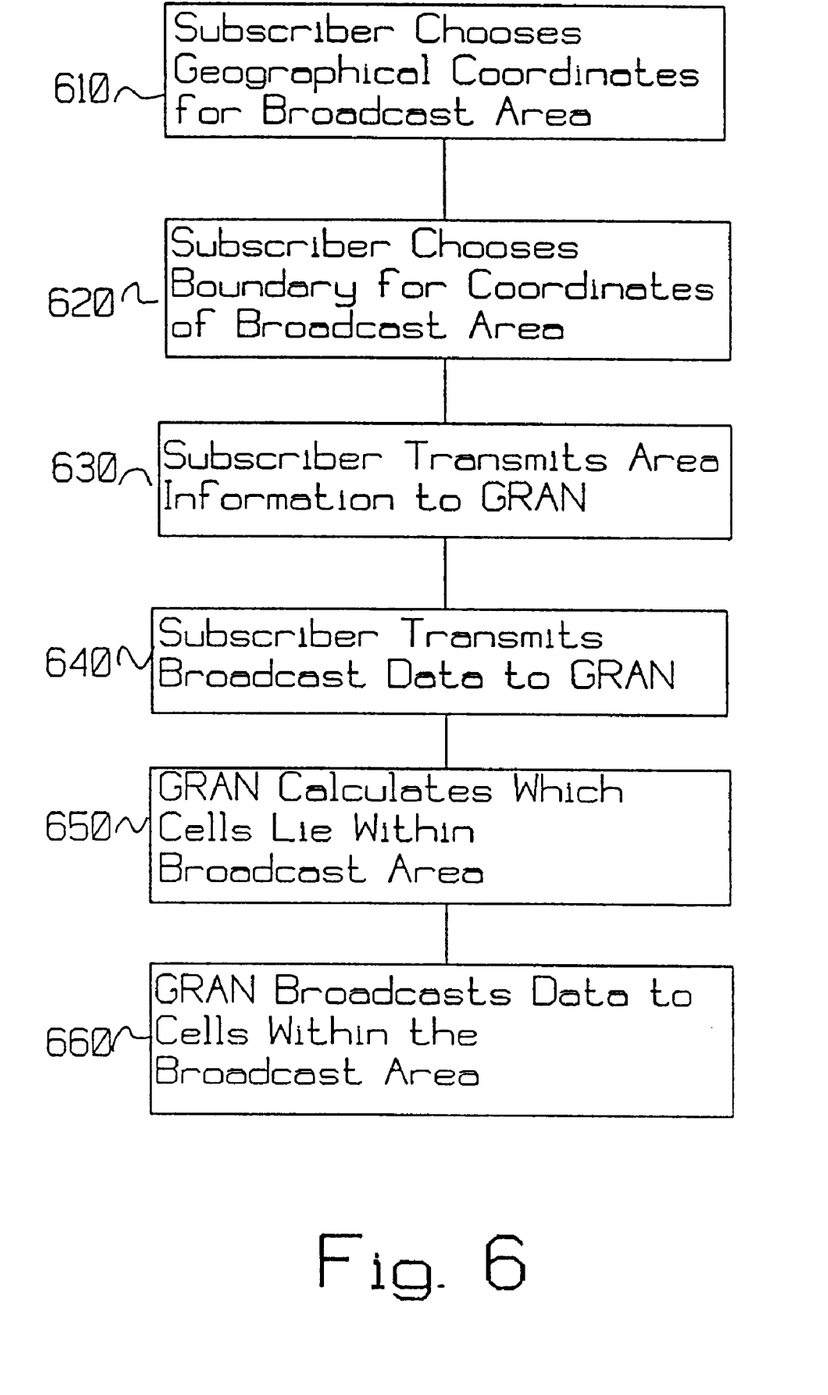
FIG. 6 is a flowchart illustrating the steps of the method in an alternative embodiment of the present invention.

FIG. 6 illustrates the embodiment of the present invention in a broadcast system. It is a subscriber that chooses the geographical coordinates 610 for the broadcast area, although it is foreseeable that a service provider might wish to broadcast data to users in certain geographical area. The subscriber then chooses the boundary 620 for the coordinates in a manner similar to that discussed above.

Next, the subscriber will transmit 630 the area information to the GRAN, followed by the broadcast data 640 that he or she wishes to broadcast. Although these two steps are shown as two distinct steps, it is certainly possible for the subscriber to send the data to the GRAN along with the area information. After the GRAN receives the area information it will calculate 650 which cells in its system lie within the broadcast area as defined by the subscriber's coordinates and boundary information. The final step will be for the GRAN to broadcast 660 the data to all the cells within the broadcast area.

The broadcast area can be defined with reference to an absolute location or in relation to a dynamic reference point, e.g. the center coordinates of the terminal's current cell. The latter can be, for instance, be used to specify a broadcast area in relation to the current location of the user's terminal, thereby enabling the user to transmit broadcast data to other terminals in the vicinity. In the GRAN the broadcast data can be labelled with a core network identifier so that it will only be received by subscribers of the concerned core network.

There are two key differences in the embodiment of the invention as used in defining a broadcast area and as used in defining a restricted mobility/service area. In defining an area for broadcasting data, it is usually a subscriber to one of the core networks that will define the area to which he or she wishes to send that data. For use in normal two-way mobile communications, it is the core network that will define the area to which the user, or a particular service, will be restricted.

The other difference is that in the use as a restricted mobility/service area, the position of the concerned terminal will be compared with the area definition to decide whether it should be allowed to access the core network or a particular service. In the use in a broadcast system, the area definition isn't used to determine whether a terminal is inside or outside the area, but merely to define an area within which all terminals may receive the broadcast data.

Still another example of an embodiment of the present invention is where an area is defined for users who are all restricted to access at one particular access port. For example, some core networks may not allow mobility for their subscribers. This could be where, for instance, the core network lacks internal support for mobility and cannot change access port for a subscriber.

In this embodiment the core network will define a restricted mobility area for all the subscribers who are restricted to access through one particular access port. If the core network accesses the GRAN through more than one access port, it will define restricted home areas for subscribers at each port. This will allow the subscribers a limited local mobility near the access port, using the mobility capabilities of the GRAN.

The types of services and service areas that can be defined are limited only by the imagination of the core network service providers. The service providers can divide their service areas into differing tariff areas. They can also divide them into differing service areas, providing ISDN service in one area, voice-only in another, paging-only in another, etc. The greater the number of services, obviously the greater the number of calculations and the greater amount of signalling involved. However, the potential for providing greater individualised service outweighs these disadvantages.

The present invention is capable of allowing the service providers to divide their services and access in any geographical manner they can devise.

In addition, the present invention is particularly suitable to cellular systems that have the capability to locate the exact position of a subscriber, rather than designating the subscriber's location to be the center of the cell through which he is accessing the GRAN. This could be location systems such as e.g. the NAVSTAR Global Positioning System ("GPS") that operate from outside the GRAN. It could also be a location system within the network similar to those well-known in the art, e.g. one using differences in times of arrival of mobile station transmissions at several cell sites. These location systems could be combined with the present invention to determine with greater accuracy whether or not a particular subscriber was within a particular area as defined by his or her core network service provider.

The embodiments described above serve merely as illustration and not as limitation. It will be apparent to one of ordinary skill in the art that departures may be made from the embodiments described above without departing form the spirit and scope of the invention. The invention should not be regarded as being limited to the examples described, but should be regarded instead as being equal in scope to the following claims.

What is claimed is:

1. A method of allowing a subscriber to a core service provider access to at least one geographical area in a mobile communications system having a cellular structure composed of cells having geographical coordinates, said mobile communications system being divided into a core service provider having subscribers and an access provider providing access to said core service provider for said subscribers, said method comprising the steps of:

choosing geographical coordinates for each of said at least one geographical areas;

choosing an enclosed boundary in relation to each of said geographical coordinates for said at least one geographical areas;

calculating which geographical coordinates for which cells lie within each of said enclosed boundaries; and permitting or refusing, by the access provider, subscriber access to said core service provider, or to at least one service of a range of services provided by said core service provider, or to broadcast data being transmitted by said core service provider or one of said subscribers, through said access provider based on the presence or absence of said cell coordinates within said geographical area.

2. The method of claim 1 wherein said step of choosing said geographical coordinates for each of said at least one areas and said step of choosing said enclosed boundary in relation to each of said geographical coordinates for said at least one geographical areas is performed by said core service provider.

3. The method of claim 2 further comprising the steps of:

attempting to access said core service provider for the first time by the subscriber through a particular cell operated by said access provider, thereby registering with said access provider;

transmitting, by the core service provider, area information about said geographical coordinates and said boundary for said subscriber to said access provider;

calculating, by the access provider, based on said area information whether said geographical coordinates for said particular cell lie within said geographical area, said presence or absence of said cell coordinates within said geographical area being determined by said calculation.

4. The method of claim 3 further comprising the step of:
storing said area information, by the access provider, for said calculation during future access attempts by said at least one subscriber.

5. The method of claim 4 wherein said geographical coordinates for each of said at least one geographical areas are chosen in relation to geographical coordinates for said subscriber at the time of said access, said boundary thereby being chosen in relation to said geographical coordinates of said subscriber at the time of attempted access.

6. The method of claim 1 wherein said geographical coordinates for each of said at least one geographical areas are chosen continuously while a subscriber accesses and subsequently moves through said system, said geographical coordinates for each of said at least one geographical areas being chosen in relation to geographical coordinates for said subscriber during the time of said access and subsequent movement.

7. The method of claim 1 wherein said mobile communications system has a cellular structure having hierarchical cell levels, the method further comprising the step of:
specifying the hierarchical cell level, or levels, to which said cells must belong to to be regarded as within said area.

8. The method of claim 2 wherein said geographical area includes all cells within which all subscribers to a given core service provider may access said system through said access provider.

9. The method of claim 1 wherein said geographical coordinates are chosen based on latitude and longitude.

10. The method of claim 1 wherein geographical coordinates of said subscriber are chosen using a position locating system such as a system external to access network, such as GPS, or a system internal to the access network, such as one using differences in times of arrival of mobile station transmissions at several cell sites.

11. The method of claim 1 wherein said boundary surrounding each of said geographical coordinates for each of said at least one geographical area is defined as the points $\underline{r}$ (border line) which fulfills the relation $$\sum_{i=0}^{nFP-1}$$

(border line)—$\overline{r}_{Pi}$ |=$R_G$ where nFP is the number of geographical coordinates within said area, Pi is the with of nFP geographical coordinates, and $\underline{R}_G$ is the generalized radius chosen.

12. The method of claim 1 further comprising the steps of transferring information on said geographical coordinates of said at least one geographical area and said boundary to a mobile terminal of said subscriber.

13. The method of claim 1 further comprising the steps of:
storing a list of said cells whose coordinates lie within each of said enclosed boundaries; and
transferring said list to a mobile terminal of said subscriber.

14. The method of claim 12 wherein said geographical coordinates are transferred only when said terminal attempts to access said core service provider while outside of said at least one geographical area.

15. The method of claim 13 wherein said list is transferred to said mobile terminal only when said subscriber attempts to access said core service provider while outside of said at least one geographical area.

16. The method of claim 1 wherein said at least one core service provider is connected to said access provider through at least one access port, at least one of said subscribers being limited to access to said core service provider through one of said at least one access ports, and said at least one subscriber being restricted to access within said geographic area.

17. The method of claim 1 wherein said step of choosing geographical coordinates for each of said at least one areas and said step of choosing said enclosed boundary in relation to each of said geographical coordinates for said at least one areas is performed by one of said subscribers, the method further comprising the steps of:
transmitting, by the subscriber, information on said geographical coordinates and said boundary to said access provider;
transmitting, by the subscriber, broadcast data to said access provider;
broadcasting, by the access provider, said broadcast data to those cells which lie within said at least one area; and
determining whether to permit or refuse access to the data based on presence or absence within said at least one geographical areas.

18. The method of claim 1 wherein service provided by said at least one core service provider and access provided by said at access provider are provided by one provider.

19. In a mobile communications system, a method for controlling subscriber access to a core network service provider, wherein the core network service provider is accessed through an access provider, the method comprising the steps of:
selecting, by the core network service provider, geographical coordinates associated with a subscriber's access area;
choosing, by the core network service provider, a boundary around the geographical coordinates, wherein the boundary around the geographical coordinates is chosen based upon shape parameters, whereby the boundary around the geographical coordinates encompasses a geographical location;
attempting access, by the subscriber, to the core network service provider through the access provider;
allowing the subscriber access to the core network service provider if the subscriber is located within the geographical location, wherein if the subscriber is attempting access for the first time from a particular cell, performing the steps of:
transmitting, from the core network service provider to the access provider, the boundary and the geographical coordinates; and
storing, in the access provider, the geographical coordinates and the boundary associated with the geographical location.

20. The method of claim 19, wherein the core network service provider provides services to the subscriber and the access network is a generic radio access network for providing access to the core network service provider.

21. A mobile communications system for controlling subscriber access to a core network service provider, wherein the core network service provider is accessed through an access provider, the mobile communications network comprising:

means for selecting, by the core network service provider, geographical coordinates associated with a subscriber's access area;

means for choosing, by the core network service provider, a boundary around the geographical coordinates, wherein the boundary around the geographical coordinates are chosen based on shape parameters, whereby the boundary around the geographical coordinates encompasses a geographical location;

means for transmitting, from the core network service provider to the access provider, the boundary and the geographical coordinates;

means for storing, in the access provider, the geographical coordinates and the boundary associated with the geographical location;

means for attempting access, by the subscriber, to the core network service provider through the access provider; and     means for allowing the subscriber access to the core network service provider if the subscriber is located within the geographical location.

\* \* \* \* \*